United States Patent
Korczyński et al.

(10) Patent No.: US 12,486,915 B2
(45) Date of Patent: Dec. 2, 2025

(54) SINGLE STAGE SERVO VALVE ASSEMBLY

(71) Applicant: Hamilton Sundstrand Corporation, Charlotte, NC (US)

(72) Inventors: Marcin Korczyński, Wrocław (PL); Adam Mościcki, Stęszów (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/641,648

(22) Filed: Apr. 22, 2024

(65) Prior Publication Data

US 2024/0353021 A1    Oct. 24, 2024

(30) Foreign Application Priority Data

Apr. 21, 2023  (EP) ..................................... 23461563

(51) Int. Cl.
*F16K 11/24* (2006.01)
*F15B 13/04* (2006.01)
(Continued)

(52) U.S. Cl.
CPC .......... *F16K 11/24* (2013.01); *F15B 13/0405* (2013.01); *F15B 13/044* (2013.01); *F16K 31/10* (2013.01)

(58) Field of Classification Search
CPC ...... F16K 11/24; F16K 31/10; F15B 13/0405; F15B 13/044
See application file for complete search history.

(56) References Cited

U.S. PATENT DOCUMENTS 2,562,631 A * 7/1951 Morrison ................ F16K 31/10
                                                    251/341
2,935,086 A * 5/1960 Lehman ................ F16K 31/404
                                                    251/38
(Continued)

FOREIGN PATENT DOCUMENTS

CN    104265975 A  *  1/2015  ......... F16K 31/0655
DE    19636855 C1     4/1998
(Continued)

OTHER PUBLICATIONS

CN-104265975 English Translation (Year: 2014).*
(Continued)

*Primary Examiner* — Umashankar Venkatesan
(74) *Attorney, Agent, or Firm* — CANTOR COLBURN LLP

(57) ABSTRACT

A single stage servo valve assembly includes a drive assembly and a valve body assembly. The valve body assembly defines: a valve body extending along a valve body axis between a first valve body end and a second valve body axis: a supply port; a control port; and a return port formed through the valve body each defining a respective fluid flow channel, having a fluid flow axis, providing fluid communication between an interior of the valve body and an exterior of the valve body. The drive assembly operates to control the flow of fluid between the supply port, the control port and the return port, via the interior of the valve body, in response to an electric command signal. Each of the supply port, and the return port includes a tapered nozzle at an interface between the interior of the valve body and the respective port fluid flow channel.

17 Claims, 5 Drawing Sheets

(51) Int. Cl.
*F15B 13/044* (2006.01)
*F16K 31/10* (2006.01)

(56) References Cited

U.S. PATENT DOCUMENTS

| | | | | |
|---|---|---|---|---|
| 3,683,962 | A * | 8/1972 | Good | F16K 11/168 |
| | | | | 137/868 |
| 3,991,788 | A * | 11/1976 | Kull | F16K 11/022 |
| | | | | 137/637.1 |
| 4,290,450 | A * | 9/1981 | Swanson | F16K 11/24 |
| | | | | 137/606 |
| 4,527,590 | A * | 7/1985 | Kolze | F16K 31/10 |
| | | | | 137/596.17 |
| 4,773,445 | A * | 9/1988 | Visket | F16K 31/06 |
| | | | | 137/870 |
| 6,273,122 | B1 | 8/2001 | Schudt et al. | |
| 6,742,542 | B1 * | 6/2004 | Dierks | F16K 31/602 |
| | | | | 280/736 |
| 7,219,697 | B2 * | 5/2007 | Neumair | F16K 31/10 |
| | | | | 137/870 |
| 8,752,584 | B2 * | 6/2014 | Grandvallet | F16K 31/0641 |
| | | | | 137/553 |
| 8,757,207 | B2 * | 6/2014 | Doerr | F16K 31/10 |
| | | | | 251/129.09 |
| 9,309,900 | B2 | 4/2016 | Kopp | |
| 10,288,187 | B2 * | 5/2019 | Vogt | F16K 31/0679 |
| 10,811,948 | B2 * | 10/2020 | Bieleń | F15B 13/044 |
| 10,969,153 | B2 * | 4/2021 | Kang | F25D 23/12 |
| 10,982,635 | B2 | 4/2021 | Harcombe et al. | |
| 11,060,536 | B2 * | 7/2021 | Bujewicz | F15B 13/0402 |
| 11,112,024 | B2 | 9/2021 | Reszewicz et al. | |
| 11,566,722 | B2 * | 1/2023 | Bujewicz | F16K 31/082 |
| 11,629,794 | B2 * | 4/2023 | Bujewicz | F16K 31/0682 |
| | | | | 137/625.65 |
| 11,781,670 | B2 * | 10/2023 | Grandvallet | F16K 11/168 |
| | | | | 137/625.65 |
| 12,066,116 | B2 * | 8/2024 | Cole | F16K 31/0655 |
| 2012/0223264 | A1 * | 9/2012 | Doerr | F16K 31/0682 |
| | | | | 251/129.15 |
| 2015/0047729 | A1 | 2/2015 | Kopp et al. | |
| 2016/0091099 | A1 * | 3/2016 | Scheibe | F16K 31/041 |
| | | | | 137/625.48 |
| 2019/0353272 | A1 | 11/2019 | Grandvallet et al. | |

FOREIGN PATENT DOCUMENTS

| | | |
|---|---|---|
| EP | 0780611 A1 | 6/1997 |
| EP | 2074345 A1 | 7/2009 |
| GB | 2104249 A | 3/1983 |
| GB | 2253928 A | 9/1992 |
| JP | 7143979 B2 | 9/2022 |
| WO | 2008043381 A1 | 4/2008 |

OTHER PUBLICATIONS

Abstract for DE19636855 (C1), Published: Apr. 23, 1998, 1 page.
Abstract for JP7143979 (B2), Published: Sep. 29, 2022, 1 page.
European Search Report for Application No. 23461563.1, mailed Oct. 5, 2023, 13 pages.

* cited by examiner

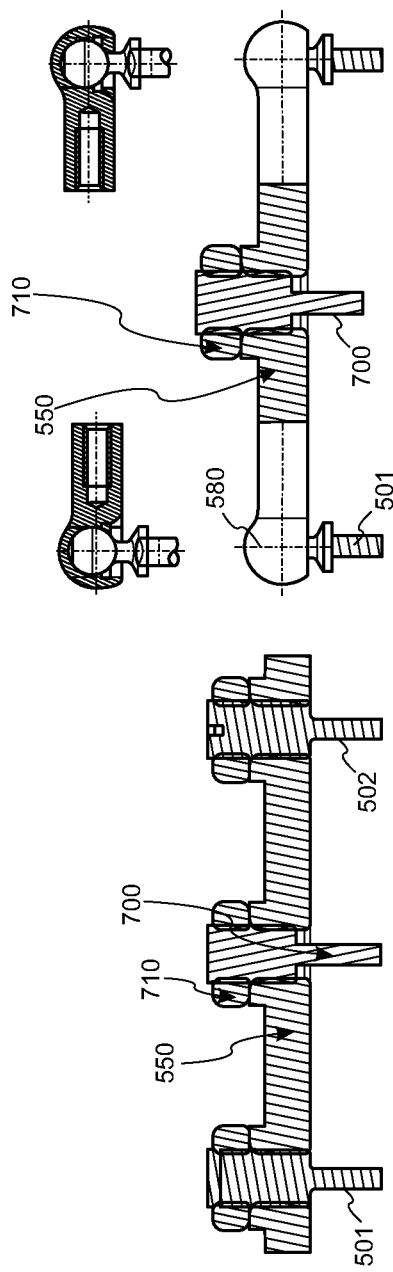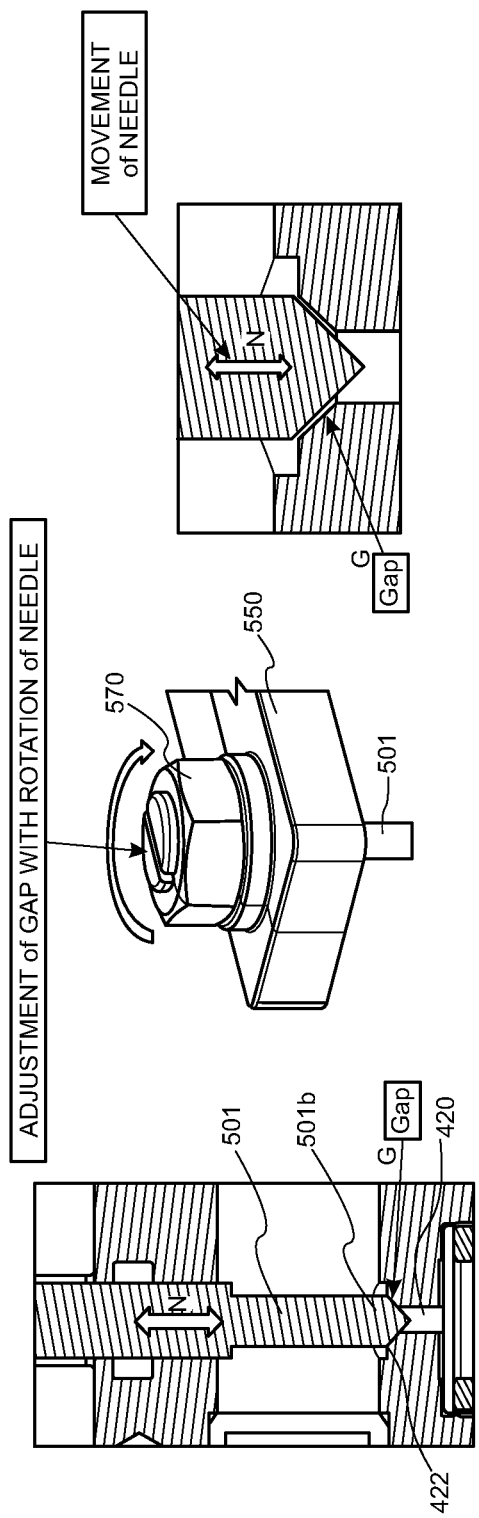

SINGLE STAGE SERVO VALVE ASSEMBLY

CROSS REFERENCE TO RELATED APPLICATIONS

This application claims priority to European Patent Application No. 23461563.1 filed Apr. 21, 2023, the entire contents of which is incorporated herein by reference.

TECHNICAL BACKGROUND

The present disclosure is concerned with servo valves and, in particular, single stage servo valves.

BACKGROUND

Servo valves find a wide range of applications for controlling air, fuel, oil or other fluid flows to effect driving or control of another part, e.g., an actuator.

A servo valve assembly may include a drive assembly such as a motor controlled by a control current which controls fluid flow to or from an actuator. Generally, a servo valve transforms an input control signal into movement of an actuator cylinder. The actuator controls another component which, in some examples, may be a valve. In other words, a servo valve acts as a controller, which commands the actuator, which changes the position of a valve's flow modulating feature.

Such mechanisms are used, for example, in various parts of aircraft where the management of fluid/air flow is required, such as in engine fuel control, oil flow, engine bleeding systems, anti-ice systems, air conditioning systems and cabin pressure systems. Servo valves also are widely used to control the flow and pressure of pneumatic, fuel and hydraulic fluids to an actuator, e.g. to control moving parts such as fuel or air systems. Some examples of applications are aircraft, automotive systems and in the space industry.

Conventionally, servo valve systems operate by obtaining pressurised fluid from a high-pressure source which is transmitted through the valve from which the fluid is output as a control fluid. Various types of servo valves are known, examples of which are described in UK Patent Application No. GB 2104249A, U.S. Patent Application Publication No. 2015/0047729 and U.S. Pat. No. 9,309,900.

Electrohydraulic servo valves can be dual stage valve, with a first stage with a motor, e.g. an electrical or electromagnetic force motor or torque motor, controlling flow of a hydraulic fluid to drive a valve member e.g. a spool valve of a second stage, which, in turn, can control flow of hydraulic fluid to an actuator for driving a load. The motor can operate to position a moveable member, such as a flapper, in response to an input drive signal or control current, to control flow through a first, pilot, stage which controls fluid flow to drive the second stage valve member e.g. a spool valve by controlling the flow of fluid acting on the spool. Movement of the spool causes alignment between the ports and fluid channels to be changed to define different flow paths for the control flow.

For low power applications, servo valves can be single stage valves, where the motor drives the flapper to control fluid flow through the main (single) stage of the valve, i.e. the valve body.

Conventional single stage servo valve systems will be described in more detail below with reference to FIGS. 1A and 1B.

In summary, in a conventional single-stage flapper type servo valve, a valve body is provided with a supply port, a control port and a return port. The valve is configured to regulate the flow of fluid from the supply port through the control port from where the fluid flows to e.g. an actuator to be controlled. With a flapper type valve, nozzles are provided in the valve body between the supply port and the control port and between the control port and the return port. A flapper element is positioned between the nozzles in the valve body and is movable relative to the nozzles according to a command signal. The flapper, in a neutral or zero position is equidistant between the nozzles such that the flow between the supply port and the control port and between the control port and the return port is small (due to the small gap between the flapper and each nozzle) and equal. If it is required to provide greater flow through the control port, the flapper is driven such that it moves closer to the nozzle between the control port and the return port than the nozzle between the supply port and the control port. This then closes (or reduces) the flow path between the control port and the return port and opens/increases the size of the flow path between the supply port and the control port. If the flapper is driven in the opposite direction, the flow path between the supply port and the control port is reduced/blocked and the flow path between the control port and the return port is opened/increased.

The flapper is driven by a torque motor that causes rotation of the flapper in response to the command signal. The flapper assembly conventionally includes an elongate flapper element mounted to a torsion plate supported on a torsion bridge. The plate is mounted between pairs of coils of the torque motor with precise air gaps therebetween for biasing the flapper to its neutral or zero position between the nozzles of the valve body. An electrical commend signal to the motor excites the motor coils which cause rotation of the flapper.

Conventional flapper and motor assemblies, however, are relatively complex and expensive and time intensive to manufacture and result in a bulky envelope of the servo valve unit. Brazed connections are required between the flapper assembly components, which is complicated and costly, and the air gaps must be cut very precisely to ensure accurate positioning of the flapper relative to the nozzles. As the nozzles are very small, this accuracy is crucial to the reliable operation of the valve. In addition, in conventional assemblies, the nozzles are manufactured as separate components and are then fitted into the valve body. Again, this requires great accuracy and is cost and time intensive.

There is, therefore, a need for a simpler, less expensive, smaller and lighter servo valve assembly whilst maintaining accuracy and reliability of operation.

SUMMARY

According to the disclosure, there is provided a single stage servo valve assembly comprising: a drive assembly; and a valve body assembly, the valve body assembly defining a valve body extending along a valve body axis between a first valve body end and a second valve body axis; a supply port, a control port and a return port formed through the valve body each defining a respective fluid flow channel, having a fluid flow axis, providing fluid communication between an interior of the valve body and an exterior of the valve body, wherein the drive assembly operates to control the flow of fluid between the supply port, the control port and the return port, via the interior of the valve body, in response to an electric command signal; wherein each of the supply port, and the return port includes a tapered nozzle at an interface between the interior of the valve body and the respective port fluid flow channel; wherein the drive assembly comprises a first elongate member extending substantially in the fluid flow axis direction with an end axially aligned with and arranged to be received in the nozzle of the supply port, and a second elongate member extending substantially in the fluid flow axis direction with an end axially aligned with and arranged to be received in the nozzle of the return port; the drive assembly further comprising means for causing substantially fluid flow axial movement of the first and the second elongate members relative to the respective nozzles responsive to the command signal, and wherein the first elongate member and the second elongate member are connected to each other such that movement of one of the first and the second elongate axial members in a first direction relative to the respective nozzle causes movement of the other elongate member in a second, opposite direction relative to its respective nozzle.

BRIEF DESCRIPTION

Examples of a servo valve assembly according to the disclosure will now be described with reference to the drawings. It should be understood that variations are possible within the scope of the claims.

FIG. 6 shows an example of a part of a servo valve according to the disclosure.

FIG. 7 shows an alternative example of the part of a servo valve according to the disclosure.

FIG. 8 is a schematic view to explain the operation of a servo valve according to the disclosure.

DETAILED DESCRIPTION

A servo valve as described below can, for example, be used in an actuator control system. The servo valve is controlled by a drive assembly to control a flow of fluid that is output to control the movement of an actuator.

Conventional single-stage flapper servo valves will first be described with reference to FIGS. 1A and 1B, by way of background.

Figure 1A:
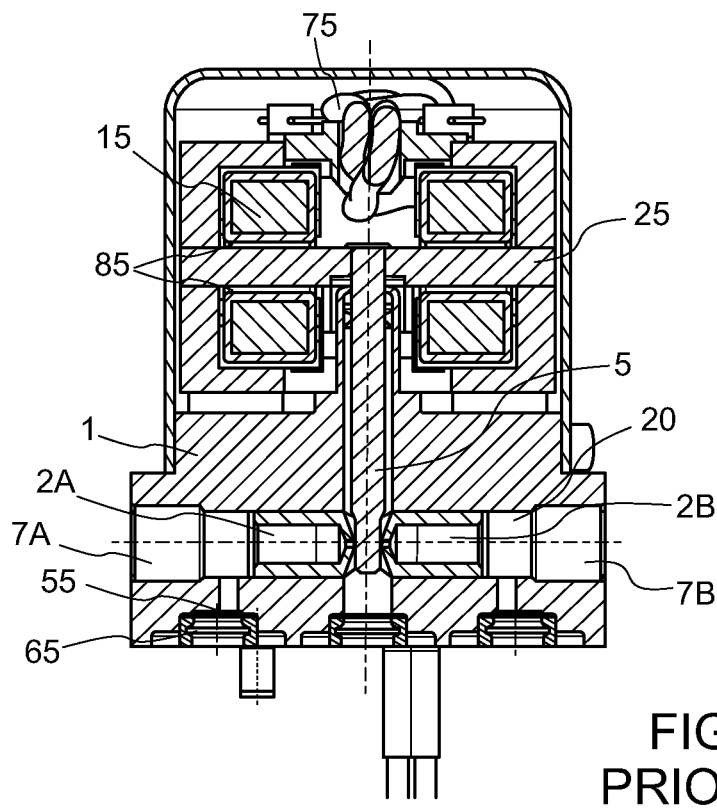
FIG. 1A shows a section through a conventional flapper type single stage servo valve.
Figure 1B:
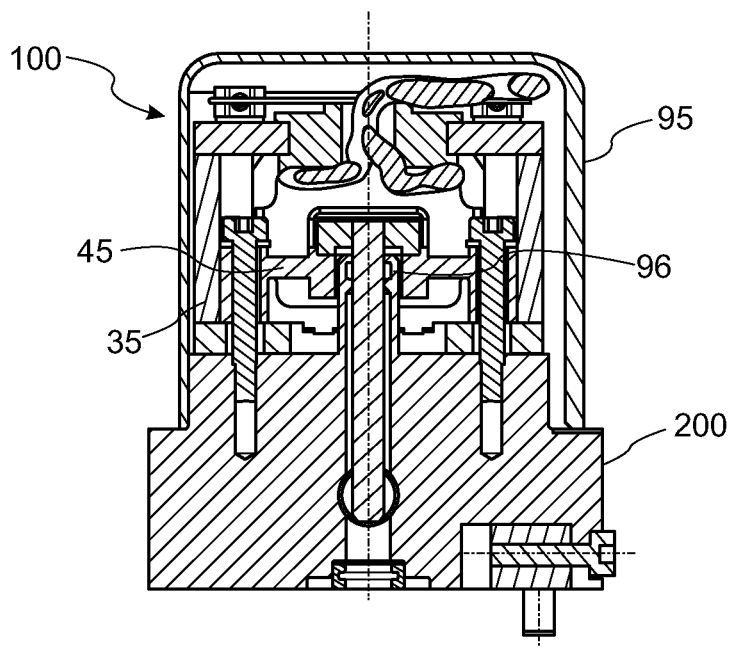
FIG. 1B is a side view of the servo valve of FIG. 1A.

A typical single-stage flapper servo valve is shown in FIGS. 1A and 1B. The assembly comprises a drive assembly 100, and a valve body assembly 200. The valve body assembly includes a housing 1 defining a valve body 20 closed at each end by a plug 7A, 7B. Pressurised fluid is provided to the valve body 20 from a supply port 10 and exits the valve body 20 via a return port 11. A flapper 5 extends into the valve body 20. The position of the flapper 5 in the valve body 20 is controlled by the drive assembly to regulate the flow of pressurised fluid from the valve body 20 out through a control port C to control e.g. a piston of the actuator or other moveable part. Nozzles 2A, 2B are provided in the valve body 20 either side of the flapper 5. The first nozzle 2A is between the flapper and the supply port 10 and the second nozzle 2B is between the flapper and the return port 11. In a balanced or neutral position, the flapper is equidistant from both nozzles and so the gap A, between the first nozzle 2A and the flapper 5 is equal to the gap B between the flapper and the second nozzle 2B. Fluid pressure is, therefore, equal either side of the flapper. If it is desired to provide fluid from the control port C to e.g. move an actuator piston (not shown) in a given direction, a command is provided to the drive, which in FIGS. 1A and 1B is a torque motor, which pivots the flapper towards nozzle 2B—i.e. from left to right in FIG. 1A which increases gap A to increase the fluid flow passage from the first nozzle 2A such that fluid from the supply port 10 flows out through the control port C. The more the flapper turns from the neutral position, e.g. to the right, the greater is gap A compared to gap B and so the fluid flow to port C (and beyond) is greater, while the flow to return port 11 is less. This difference causes the piston to move in a first direction. If the position of the flapper is reversed and gap A is smaller than gap B, then there is less flow through nozzle 2A to port C and more flow from port C to port 11, which causes the piston to move in the opposite direction. Filters 55 and/or screen rings 65 may be provided to filter fluid at the ports.

In more detail, in the conventional flapper type assemblies, to open the servo valve, control current is provided to coils 15 of the motor (e.g. a torque motor) creating electromagnetic torque opposing the sum of mechanical and magnetic torque already 'present' in the torque motor. The bigger the electromagnetic force from the coils, the more the flapper pivots. The more it pivots, the greater the flow through the control port C. A torque motor usually consists of coil windings 15, a ferromagnetic armature 25, permanent magnets 35 and a mechanical spring forming a torsional bridge 45 (e.g. two torsional bridge shafts). This arrangement provides movement of the flapper proportional to the input control current.

Electric wiring 75 is provided to provide the command signal to the motor.

Air gaps 85 are provided between the motor coils and the armature to ensure precise positioning of the flapper in its neutral position between the nozzles. These air gaps have to be precisely cut. If there is any imprecision in the size and shape of the air gaps, this can result in valve failure where the armature 25 plate to the pole pieces of the motor. The cutting process is performed by an EDM machine and is time consuming. Because the process takes place on the assembled valve fluid used in the cutting process can introduce dirt which, if not properly rinsed, can block the valve during operation.

The drive assembly 100 is enclosed by a cover 95 that sits on the housing 1 of the valve assembly 200.

An O-ring 96 can provide sealing support around the flapper.

As mentioned above, conventional flapper type servo valves require complex and expensive parts and require brazed connections between the armature plate, the flapper and the torsion bridge. The air gaps and the nozzles also have to be very precisely manufactured.

The servo valve of the present disclosure provides an alternative structure and principle of operation to overcome these problems. An example will be described with reference to FIGS. 2 to 8. Where the description refers to 'fluid' this may be air or fuel or other hydraulic or pressurised fluid.

Rather than having a flapper member that moves, responsive to the motor drive, relative to opposing nozzles in the valve body to regulate the flow through the valve ports, the present assembly has the nozzles formed at the ports of the servo valve and has a 'needle' or elongate member associated with each of the port nozzles that has an end (hereinafter the nozzle end) configured to fit in and move relative to the respective nozzle (in the direction of flow axis through the nozzle) by means of electrical power, whereby the needle associated with the control port and the needle associated with the return port are fixed, at their ends opposite the nozzle ends, to a plate such that substantially axial movement of one needle relative to (i.e. towards or away from) its associated nozzle causes a tilting of the plate to cause an opposing movement of the other needle relative to its associated nozzle. This will be described in more detail below.

The servo valve comprises a comprises a drive assembly 300, and a valve body assembly 400. The valve body assembly includes a housing 401 defining a valve body 402 closed at each end by a plug 403a, 403b. Pressurised fluid is provided to the valve body 402 from a supply port 410 and exits the valve body 402 via a return port 411.

The supply port 410 has a first end 410a at the exterior of the valve body housing 401 configured to be fluidly connected to a supply of pressurised fluid, and a second end 410b in the valve body housing. A channel 420 provides fluid flow through the valve body housing from the control port 410 into the valve body 420 via an opening 422 which forms a nozzle as will be described further below.

Similarly, the return port 411 has a first end 411a at the exterior of the valve body housing 401 configured to be fluidly connected to a return reservoir for pressurised fluid, and a second end 411b in the valve body housing. A channel 430 provides fluid flow through the valve body housing from the valve body 420 to the return port 411 via an opening 432 which forms a nozzle as will be described further below.

A control port 412 is in fluid communication with the valve body 420, between the supply and return ports (as seen relative to the axis A of the valve body extending between from one end plug 403a to the other 403b), via a channel 440. The control port 412 provides the output of the servo valve for controlling e.g. an actuator. The flow of fluid through the control port depends on and is regulated by the relative degrees of opening of the supply port and return port nozzles 422, 432. The relative degrees of opening of the nozzles is controlled by the needle assembly 500 of the drive assembly 300.

The needle assembly 500 (described further below) extends from the drive assembly 300 into the valve body 402. The position of the needle assembly 500 in the valve body 402 relative to the supply and return ports is controlled by the drive assembly to regulate the flow of pressurised fluid from the valve body 402 out through a control port 412 to control e.g. a piston of the actuator or other moveable part.

The drive assembly 300 includes the needle assembly 500 and a respective electric coil associated with each needle to cause movement of the respective needle relative to the respective nozzle.

The drive assembly is preferably located within a servo valve cover 350 which may be secured to the valve body housing 401 to form a single servo valve unit. The cover 350 and the valve body housing 401 may be secured together by means of screws 360 or other fasteners. In the example shown, a locating pin 450 extends from the valve body housing 401 for accurate location and positioning of the servo valve to another part e.g. a pump, to which it is mounted, in use.

The needle assembly 500 comprises a first needle 501 and a second needle 502. Each needle is an elongate member extending from a first end 501a, 502a arranged in the drive assembly 300, through the valve body housing 401 to a second, pointed or conical end 501b, 502b arranged to locate in the port nozzles 422, 432. The second end 501b of the first needle 501 is arranged to fit into the nozzle 422 of the control port 410 and the second end 432 of the second needle 502 is arranged to fit in the nozzle 432 of the return port. The size and shape of the second ends matches that of the nozzles so that when the second end of the needle is located in the respective nozzle, a tight fit is formed such that fluid is not able to flow through the nozzle. The first and second needles are mounted, at their first ends 501a, 502a, to a plate 550 located in the drive assembly 300 part of the servo valve, the needles being secured to and spaced apart from each other in the plate by a distance corresponding to the spacing between the supply port and the return port such that the needles extend straight down from the plate 550 to the respective nozzles. The needles may be secured to the plate by passing through apertures 560 in the plate 550 and being fastened by nuts 570. The needles may, however, be secured to the plate 550 in other ways.

An electric coil 601, 602 is provided around each of the needles 501, 502 and is provided with means (e.g. wires 610) for connection to an electric power supply (not shown). The coils and the needles together create an electromagnet, where the needle is the core and the coil creates the electric field when power is supplied to the coil.

The plate 550 is held in the drive assembly 300 relative to the valve body housing by means of a spring plate 700 that extends from, and is secured to, the plate 550, at one end 701, and the valve body housing 401 at a second end 702. The ends of the spring plate may be respectively secured by a nut 710 or other fastener. The spring plate is an element that is sufficiently rigid to hold the plate relative to the valve body housing so that the needles are appropriately positioned, but provides some flexibility to allow a tilting movement of the plate 550 as described below.

For completeness, seals 750 may be provided where the needles pass through the valve body housing and, as is conventional. O-ring seals 460 and filters 470 may be provided at each of the ports.

The elongate needles may have a constant diameter along their length up to the tapered end. Alternatively, the diameter may vary between the ends. In the example shown, the diameter is greater where the needles are attached to the plate 550 and also where the needles pass through the coils (or a nut 555 may be provided around the needle at this location).

The operation of the servo valve of the disclosure will now be described with particular reference to FIGS. 4 to 8.

Figure 2A:
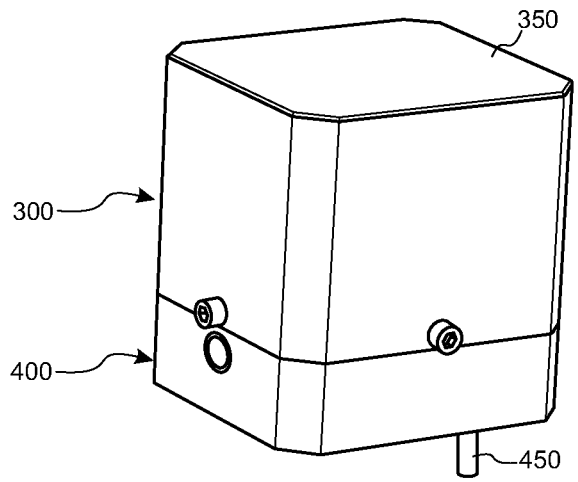
FIG. 2A shows an exterior view of a servo valve according to the disclosure.
Figure 2B:
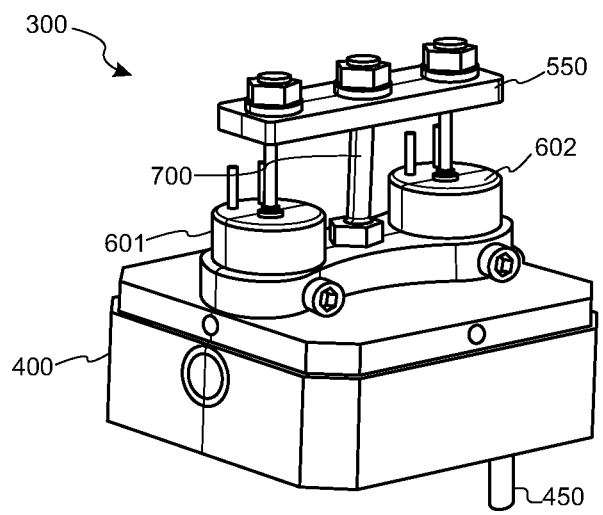
FIG. 2B shows the servo valve of FIG. 2A with the cover removed.
Figure 2C:
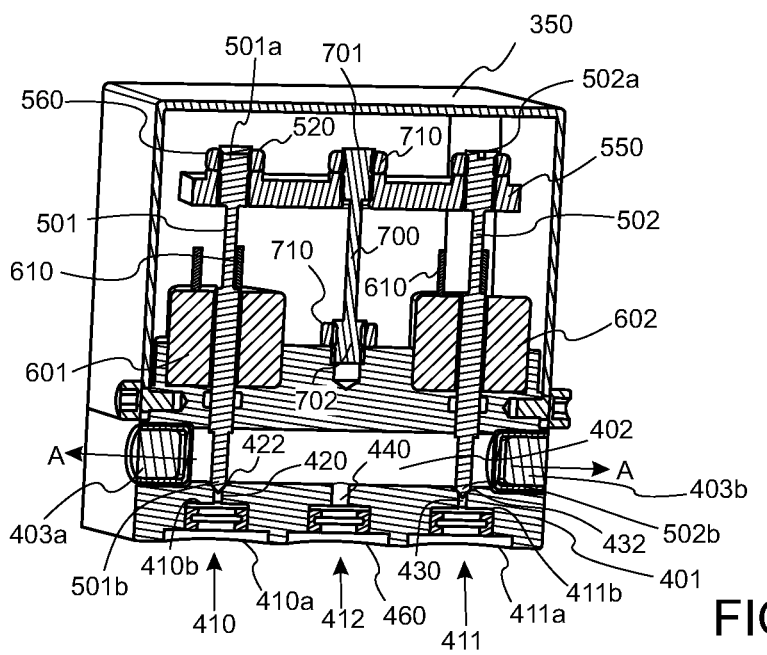
FIG. 2C is a view of the interior of a servo valve such as shown in FIGS. 2A and 2B.
Figure 3:
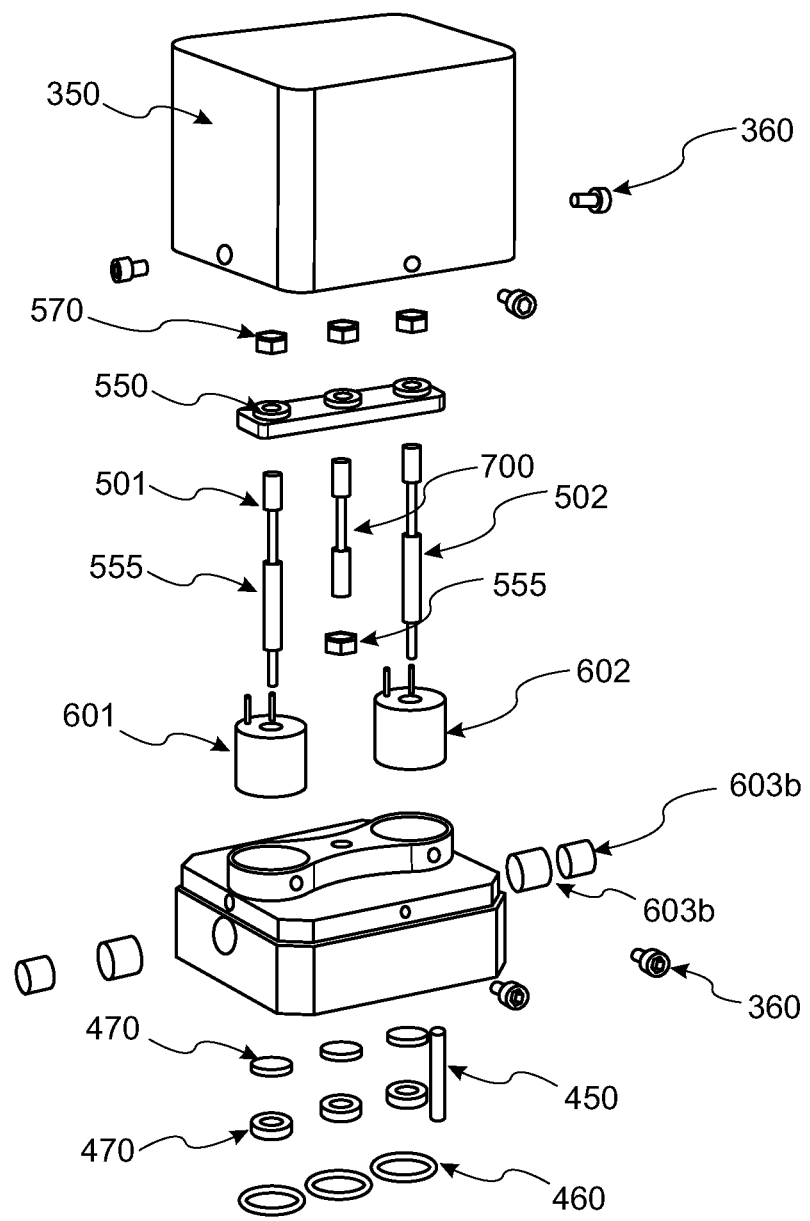
FIG. 3 is an exploded view of a servo valve according to the disclosure.
Figure 4:
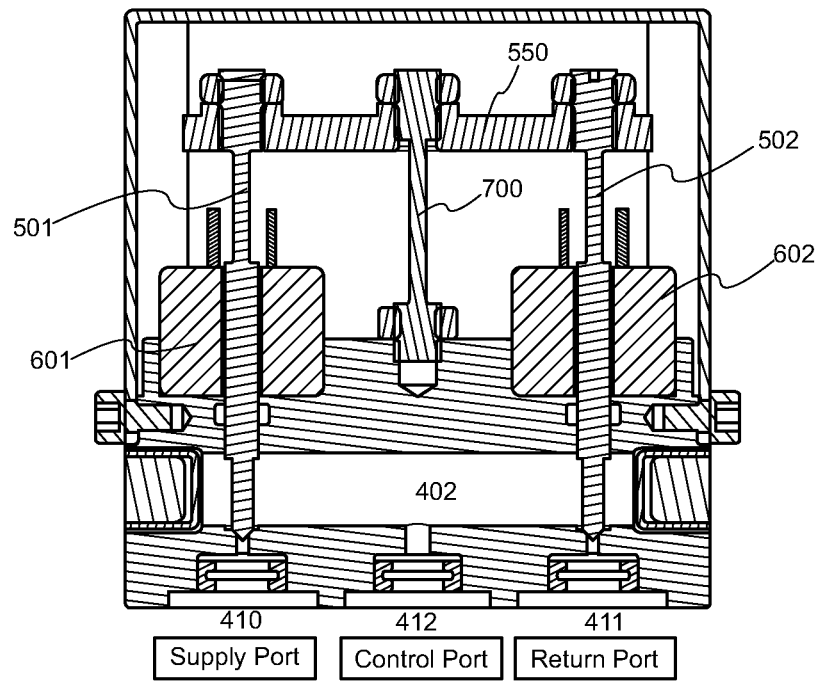
FIG. 4 is a sectional view of a servo valve according to the disclosure.

FIG. 4 is similar to FIG. 2C but in cross-section and shows the servo valve in its neutral position in which the pressure in the servo valve is balanced. The needles are configured, and positioned, such that at this neutral position, both second ends 501b, 502b are slightly held away from the respective nozzles 422, 432 providing a small gap G between the needle end and the nozzle such that and fluid from the supply port will flow out through the return port.

Figure 5:
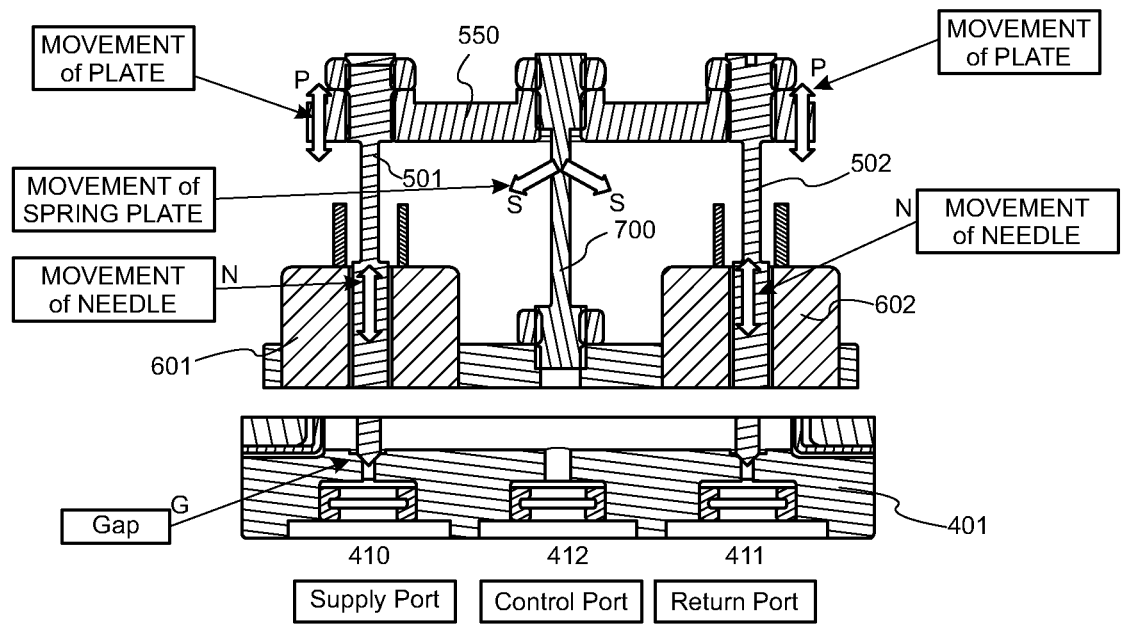
FIG. 5 is a schematic view to show operation of a servo valve according to the disclosure.

FIG. 5 shows, with arrows N how the needles 501, 502 move relative to the valve body when power is applied to the coils 601, 602. Arrows P indicate the direction of movement of the plate 550 relative to the valve body. Arrows S show the direction of movement of the spring plate 700. As the needles move relative to the valve body in the direction of arrows N, the conical ends 501b, 502b move into tight-fitting engagement in the respective port nozzles or, in the opposite direction, slightly away from the respective nozzle to create a small gap G between the needle and the nozzle through which fluid can flow. The gap can best be seen in FIG. 8.

It is, in some examples, possible to adjust the size of the gap G by changing the attachment of the needle in the plate 550 e.g. by rotating the needle or fastener.

Before, and at stages during use, the servo valve must be calibrated such that the gap G is closed or opened by the correct application of power to the coils and such that the gap is equal when in the neutral position. Calibration may consist of setting the gap between the first needles and the control port nozzle to be equal to that between the second needle and the return port nozzle when the plate 550 is flat. The nuts fastening the needles to the plate can be adjusted to ensure the gap is equal.

FIG. 6 shows one example of how the needles 501, 502 can be attached to the plate 550, where the first ends 501a, 502a of the needles pass through apertures in the plate and are secured by nuts. An alternative way of attaching the needles to the plate is shown in FIG. 7 wherein the needles are attached to the plate via a ball and socket fitting 580. This form of attachment can be used to make the arrangement less rigid. Other ways of attaching the needles to the plate are also possible.

If the servo valve is to operate to provide pressurised fluid from the supply to the control port, electric power will be applied to the coils in such a manner that a field is created to cause the first needle 501 to move upwards and away from the control port (as shown with arrow N) such that the gap G is created between the second end 501b of the first needle 501 and the control port nozzle 422. The coils are not powered to drive the second needle at this time. As the first needle moves, it causes the plate 550 to move in the same direction. Because the spring plate 700 is fixed between the plate and the valve body, though, the end of the plate where the first needle is attached will lift and the plate 550 will tilt about the flexible spring plate 700 (see arrows S) thus causing the other end of the plate, to which the second needle 502 is attached to tilt downwards. This results in the second needle moving down into tight-fitting engagement with the nozzle 432 of the return port so that the return port is closed—i.e. no fluid can flow from the valve body through the return port 411. Instead, the fluid from the supply port will be forced out through the control port 412.

To reverse the direction of fluid flow, the second needle will be driven by the coils, e.g. by changing the polarity of the coils, to lift away from the return port nozzle 432 and, because the plate will tile about the spring plate, the first needle will be driven into tight engagement with the control port nozzle to close of that flow path and to therefore provide a flow path between the control port and the return port.

The spring plate 700 is biased to return the plate, and, therefore the needles, to the neutral position.

In one example, the coils are configured such that the application of power to a coil causes movement of the respective needle away from the nozzle, but the coils could also feasibly be designed different e.g. such that powering of a coil causes a downward movement of its respective needle.

The servo valve assembly of this disclosure provides a smaller, lighter and simpler assembly having fewer individual/expensive/complex parts and reduces the need to precisely manufacture and solder components of the flapper arrangement of known assemblies. Further, the servo valve can be hermetically sealed in a unit which can eliminate the ingress of pollution. The servo valve can be easily manufactured, assembled and calibrated.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A single stage servo valve assembly comprising:
a valve body assembly, the valve body assembly defining;
  a valve body extending along a valve body axis between a first valve body end and a second valve body end; and
  a supply port, a control port and a return port formed through the valve body each defining a respective fluid flow channel, having a fluid flow axis, providing fluid communication between an interior of the valve body and an exterior of the valve body;
  wherein each of the supply port, and the return port includes a tapered nozzle at an interface between the interior of the valve body and the respective port fluid flow channel; and
a drive assembly configured to control a flow of fluid between the supply port, the control port and the return port, via the interior of the valve body, in response to an electric command signal;
wherein the drive assembly comprises:
  a first elongate member extending substantially in the fluid flow axis direction with an end axially aligned with and arranged to be received in the nozzle of the supply port;
  a second elongate member extending substantially in the fluid flow axis direction with an end axially aligned with and arranged to be received in the nozzle of the return port; and
  means for causing movement of the first and the second elongate members relative to the respective nozzles responsive to the command signal;
  wherein the first elongate member and the second elongate member are connected to each other such that movement of one of the first and the second elongate axial members in a first direction relative to the respective nozzle causes movement of the other elongate member in a second, opposite direction relative to its respective nozzle;

wherein the means for causing movement of the first and second elongate members comprises a first electric coil provided around the first elongate member and a second electric coil provided about the second elongate member.

2. The assembly of claim 1, wherein each of the first elongate member and the second elongate member is a needle having a tapered end to be received in the respective nozzle and the nozzles are formed with a corresponding taper such that the respective end is sealing received in the nozzle.

3. The assembly of claim 1, wherein the first elongate member and the second elongate member are connected to each other by means of a plate.

4. The assembly of claim 3, wherein the first and second elongate members are secured to the plate at ends of the elongate members opposite to the ends that are received in the nozzles.

5. The assembly of claim 3, wherein the plate is supported relative to the valve body by means of a resilient plate to allow for the opposing movement of the elongate members by tilting the plate about the resilient plate.

6. The assembly of claim 5, wherein the resilient plate is a spring plate biased to return the plate to a neutral position in the absence of a command signal.

7. The assembly of claim 1, further comprising conductive wires for supplying power to the first and second electromagnetic coils.

8. The assembly of claim 1, wherein the drive assembly and the valve assembly are mounted in a housing.

9. The assembly of claim 8, wherein a locating pin extends from the housing for securing the servo valve assembly to another part.

10. The assembly of claim 1, further comprising:
a seal at each of the supply port, the control port and the return port.

11. The assembly of claim 1, further comprising:
a filter at each of the supply port, the control port and the return port.

12. A single stage servo valve assembly comprising:
a valve body assembly, the valve body assembly defining;
  a valve body extending along a valve body axis between a first valve body end and a second valve body end; and
  a supply port, a control port and a return port formed through the valve body each defining a respective fluid flow channel, having a fluid flow axis, providing fluid communication between an interior of the valve body and an exterior of the valve body;
  wherein each of the supply port, and the return port includes a tapered nozzle at an interface between the interior of the valve body and the respective port fluid flow channel; and
a drive assembly configured to control a flow of fluid between the supply port, the control port and the return port, via the interior of the valve body, in response to an electric command signal;
wherein the drive assembly comprises:
  a first elongate member extending substantially in the fluid flow axis direction with an end axially aligned with and arranged to be received in the nozzle of the supply port;
  a second elongate member extending substantially in the fluid flow axis direction with an end axially aligned with and arranged to be received in the nozzle of the return port; and
  means for causing movement of the first and the second elongate members relative to the respective nozzles responsive to the command signal;
  wherein the first elongate member and the second elongate member are connected to each other such that movement of one of the first and the second elongate axial members in a first direction relative to the respective nozzle causes movement of the other elongate member in a second, opposite direction relative to its respective nozzle;
  wherein the first and second ends of the valve body are sealed by a respective first and second plug;
  wherein the first and second elongate members are secured to the plate by means of fastening nuts.

13. The assembly of claim 12, wherein the position of the ends of the elongate members relative to the respective nozzles can be adjusted by rotation of the fastening nuts.

14. The assembly of claim 12, wherein the drive assembly and the valve assembly are mounted in a housing.

15. The assembly of claim 14, wherein a locating pin extends from the housing for securing the servo valve assembly to another part.

16. The assembly of claim 12, further comprising:
a seal at each of the supply port, the control port and the return port.

17. The assembly of claim 12, further comprising:
a filter at each of the supply port, the control port and the return port.

* * * * *